Figure 1:
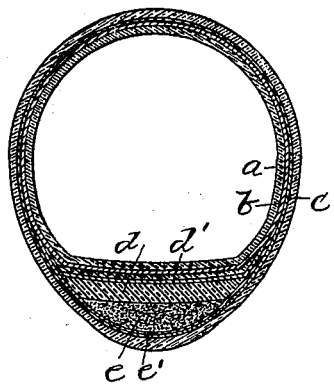

No. 619,544. Patented Feb. 14, 1899.
G. H. CLARK.
PNEUMATIC WHEEL TIRE.
(Application filed Sept. 21, 1898.)

(No Model.)

Witnesses,
H. B. Davis.
J. L. Hutchinson.

Inventor,
George H. Clark
by P. J. Hayes,
Atty.

UNITED STATES PATENT OFFICE.

GEORGE H. CLARK, OF BOSTON, MASSACHUSETTS.

PNEUMATIC WHEEL-TIRE.

SPECIFICATION forming part of Letters Patent No. 619,544, dated February 14, 1899.

Application filed September 21, 1898. Serial No. 691,483. (No model.)

*To all whom it may concern:*

Be it known that I, GEORGE H. CLARK, of Boston, county of Suffolk, and State of Massachusetts, have invented an Improvement in Pneumatic Wheel-Tires, of which the following description, in connection with the accompanying drawings, is a specification, like letters on the drawings representing like parts.

This invention has for its object to construct a tread-strip for pneumatic wheel-tires which shall be light and resilient and yet may be made of considerable thickness, and when incorporated in the tire at the tread side of the air-tube will serve as a protector to prevent the air-tube from being easily punctured.

In accordance with this invention the tread-strip is composed, essentially, of two strips of material, one of which is flexible but not compressible to any great extent, to thereby present a firm body—as cork, for instance—and the other of which is not only flexible, but very yielding—as sponge-rubber, for instance—and said two strips of material are laid one upon the other and secured together for their entire length. It is preferable to place the strip of cork upon the inside and the strip of sponge-rubber upon the outside, as in such case the strip of cork serves as a firm foundation or support for the strip of sponge-rubber. The compound strip thus composed of a strip of cork and a strip of sponge-rubber secured together for their entire length will be incorporated in the tire at the tread side of the air-tube; but when the air-tube is inflated such compound strip will be extended in the direction of its length to such an extent as to break the cork strip at intervals unless means are provided to prevent such result, and also when the air-tube is inflated the strip of sponge-rubber will be more or less compressed and its yielding quality diminished unless means are provided to prevent such result. Consequently I have secured to the compound strip for its entire length a strip of substantially non-extensible material which effectually prevents said compound strip of being extended when the air-tube is inflated, and for the accomplishment of such result said non-extensible strip may be applied to either the outside or inside of said compound strip; but to provide against compressing the strip of sponge-rubber said non-extensible strip will be applied to the inside of the compound strip. In practice, however, I prefer to employ two substantially non-extensible strips of textile material and to apply one to the inside and the other to the outside of the compound strip, thus inclosing said compound strip in a substantially non-extensible jacket or sheath. Such a tread-strip is light and flexible and may be made of considerable thickness, and the strip of sponge-rubber or other yielding material provides a soft and yielding or compressible tread.

Figure 2:
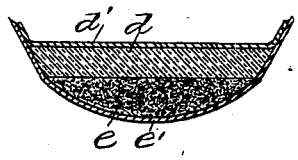

Figure 1 shows in cross-section a pneumatic wheel-tire embodying this invention, and Fig. 2 is a cross-section of the tread-strip.

The pneumatic wheel-tire to which the tread-strip embodying this invention may be applied may be of any usual or suitable construction; but for the purpose of illustrating the invention I have herein shown a tire comprising an air-tube *a*, inclosed in a canvas sheath *b*, upon the tread side of which the tread-strip is applied, and a canvas sheath *c* and an outer covering inclose the sheathed air-tube and tread-strip.

The tread-strip is made circular and is composed of two strips of material, one of which, as *d*, is made quite thick and presents a flexible yet firm foundation-strip to support the other strip *e*, which is placed upon and secured to it for its entire length.

The strip *d* may be composed of cork, as such material is light, yet flexible, and does not yield to any great extent, and consequently will serve to hold in normal shape the strip *e*, which is placed upon and secured to it. The strip *e* is flexible and very yielding and may be composed of sponge-rubber, as such material I find to be well suited for the purpose. These two strips *d* and *e* will be cemented and vulcanized together or may be attached together for their entire length in any other suitable way. To prevent the compound strip thus produced from stretching, and thereby breaking the strip of cork at intervals, as well as materially changing the normal shape of the compound strip, a strip or strips of substantially non-extensible textile material will be secured for the entire length to the outside of one of the strips, or it may be to both of the strips—as, for instance, I may provide a strip $d'$, of canvas, which will be secured to the strip $d$, and also a strip $e'$, of canvas, which will be secured to the strip $e$, and said strips $d'$ and $e'$ may and preferably will be made wider than the strips to which they are attached, so that the projecting edges may be secured together, thus presenting a jacket or sheath which incloses the strips $d$ and $e$.

Providing a tread-strip with a substantially non-extensible strip or strips, as described, enables the tread-strip to retain its normal shape as the air-tube is inflated and also prevents extension of said tread-strip and also prevents compression of the yielding strip $e$ by reason of internal pressure, which is important.

I claim—

1. In a pneumatic wheel-tire, a circular tread-strip at the tread side of the air-tube consisting of a flexible strip and a yielding flexible strip secured together and a substantially non-extensible strip of textile material secured to the said tread-strip, substantially as described.

2. In a pneumatic wheel-tire, a circular tread-strip at the tread side of the air-tube consisting of a flexible strip and a yielding flexible strip secured together and a substantially non-extensible jacket inclosing said tread-strip, substantially as described.

3. In a pneumatic wheel-tire, a circular tread-strip at the tread side of the air-tube consisting of a strip of cork and a strip of sponge-rubber, one placed upon the other and secured together, substantially as described.

4. In a pneumatic wheel-tire, a tread-strip at the tread side of the air-tube consisting of an inside strip of cork and an outside strip of sponge-rubber secured together, substantially as described.

5. In a pneumatic wheel-tire, a tread-strip at the tread side of the air-tube consisting of an inside strip of cork and an outside strip of sponge-rubber secured together, and a substantially non-extensible strip of textile material secured to said tread-strip, substantially as described.

6. In a pneumatic wheel-tire, a strip of sponge-rubber at the tread side of the air-tube, and a substantially non-extensible strip interposed between said sponge-rubber strip and the air-tube, whereby compression of the cells of said sponge-rubber strip is prevented when the air-tube is inflated, substantially as described.

7. In a pneumatic wheel-tire, a strip of sponge-rubber at the tread side of an expansible air-tube and a substantially non-extensible strip interposed between said strip of sponge-rubber and the expansible air-tube whereby compression of said sponge-rubber strip is prevented when the air-tube is expanded, substantially as described.

In testimony whereof I have signed my name to this specification in the presence of two subscribing witnesses.

GEORGE H. CLARK.

Witnesses:
B. J. NOYES,
JENNIE L. HUTCHINSON.